US008598488B2

(12) United States Patent
O'Connor et al.

(10) Patent No.: US 8,598,488 B2
(45) Date of Patent: Dec. 3, 2013

(54) METHOD AND APPARATUS FOR ADJUSTING RADIATION SPOT SIZE (75) Inventors: Ciaran John Patrick O'Connor, Bozeman, MT (US); Shane Hilliard, Bozeman, MT (US); Leif Summerfield, Bozeman, MT (US)

(73) Assignee: Electro Scientific Industries, Inc., Portland, OR (US)

( * ) Notice: Subject to any disclaimer, the term of this patent is extended or adjusted under 35 U.S.C. 154(b) by 188 days.

(21) Appl. No.: 13/336,992

(22) Filed: Dec. 23, 2011

(65) Prior Publication Data
US 2013/0161510 A1 Jun. 27, 2013

(51) Int. Cl.
*B23K 26/38* (2006.01)

(52) U.S. Cl.
USPC .............. 219/121.67; 219/121.6; 219/121.61; 250/492.2

(58) Field of Classification Search
USPC ........ 250/505.1, 458.1, 459.1, 492.2, 492.22; 219/121.6, 121.67, 121.61
See application file for complete search history.

(56) References Cited

U.S. PATENT DOCUMENTS

| | | | |
|---|---|---|---|
| 4,941,093 A * | 7/1990 | Marshall et al. ................. 606/5 |
| 5,387,211 A * | 2/1995 | Saadatmanesh et al. ........ 606/10 |
| 6,436,093 B1 | 8/2002 | Ruiz et al. |
| 6,508,812 B1 * | 1/2003 | Williams et al. ................. 606/5 |
| 6,534,774 B2 * | 3/2003 | Hasegawa et al. ......... 250/458.1 |
| 6,693,286 B2 * | 2/2004 | Hasegawa et al. ......... 250/458.1 |
| 6,717,101 B2 * | 4/2004 | Morris et al. ............ 219/121.67 |
| 6,923,802 B2 | 8/2005 | Williams et al. |
| 6,937,331 B1 * | 8/2005 | Nguyen ........................ 356/305 |
| 7,405,413 B2 * | 7/2008 | Hergenhan et al. ......... 250/492.2 |
| 2002/0003210 A1 | 1/2002 | Marcus |
| 2002/0045283 A1 * | 4/2002 | Hasegawa et al. .............. 438/16 |
| 2003/0094579 A1 * | 5/2003 | Hasegawa et al. ......... 250/458.1 |
| 2005/0001176 A1 * | 1/2005 | Loney et al. ............... 250/458.1 |
| 2006/0024216 A1 * | 2/2006 | Hergenhan et al. ........ 422/186.3 |
| 2011/0031655 A1 | 2/2011 | Toth et al. |
| 2011/0132549 A1 | 6/2011 | Sercel et al. |

FOREIGN PATENT DOCUMENTS

| | | |
|---|---|---|
| JP | 7100685 A | 4/1995 |
| KR | 2008079828 A | 9/2008 |
| WO | WO 03/044502 A1 | 5/2003 |
| WO | WO2004/075174 A2 | 9/2004 |

OTHER PUBLICATIONS

International Search Report of PCT/US2012/063102, 2 pages.
Written Opinion of PCT/US2012/063102, 6 pages.
Stephan Klemme et al. "Trace-elecment Partitioning Between Apatite and Carbonatite Melt", Department of Earth Sciences, University of Bristol, American Mineralogist, vol. 88, pp. 639-646, 2003.
Marcel Guillong et al., "Determination of Sulfur in Fluid Inclusions by Laser Ablation ICP-MS", Journal of Analytical Atomic Spectrometry, 2008, 14 pages.

* cited by examiner

*Primary Examiner* — Nikita Wells
*Assistant Examiner* — Johnnie L Smith (57) ABSTRACT

An apparatus can include a first beam cropper configured to crop a portion of a radiation pulse having a first spot size to form an intermediate cropped radiation pulse having an intermediate cropped spot with an intermediate cropped spot size less than the first spot size; and a second beam cropper configured to crop the intermediate cropped spot to form a second cropped radiation pulse having a second cropped spot with a second cropped spot size less the intermediate cropped spot size.

23 Claims, 4 Drawing Sheets

METHOD AND APPARATUS FOR ADJUSTING RADIATION SPOT SIZE

BACKGROUND

Embodiments of the present invention as exemplarily described herein relate generally to apparatuses for adjusting the spot size of radiation pulses and to methods of adjusting the spot size of radiation pulses.

An analysis apparatuses such as a mass spectrometer can analyze the composition of a target material. Often, a sample of the target material is provided to an analysis apparatus in the form of an aerosol. A conventional aerosol producing apparatus can produce an aerosol by directing a radiation pulse having a fluence sufficient to ablate a portion of the target material. The ablated material is typically ejected from the bulk of the target material in the form of an aerosol plume.

It is often desirable to perform different types of compositional analyses of the target material using the analysis apparatus. Consequently, it can be desirable for the aerosol producing apparatus to produce individual plumes of aerosols containing different amounts of target material. For example, to perform a "bulk compositional analysis" of the target material, the aerosol plume should generally be produced from a relatively large area of the target material. Thus, the aerosol, producing apparatus produces an aerosol plume that is relatively large in size and that contains a relatively large amount of material removed from the target. Such a bulk compositional analysis can be helpful in providing information indicating the amount of an arbitrary component is present in the target material. However, to perform a "spatial compositional analysis" of the target material, the aerosol plume should generally be produced from a relatively small area of the target material. Thus, the aerosol producing apparatus produces an aerosol plume that is relatively small in size and that contains a relatively small amount of material removed from the target. Such a spatial compositional analysis can be helpful in providing information indicating how the amount of an arbitrary component changes at different locations (e.g., within a region of interest) in the target material.

Conventionally, aerosol producing apparatuses produce aerosol plumes of different sizes by using an aperture wheel having a diaphragm with a plurality of apertures of varying sizes defined therein to "crop" the spot size of a radiation pulse used to produce the aerosol plume. While dimensions of the apertures can be precisely defined within the aperture wheel, the number of apertures defined within the aperture wheel depends upon the size of the aperture wheel as well as other size limitations of the aerosol producing apparatus.

SUMMARY

In one embodiment, an apparatus may be provided with a first beam cropper configured to crop a portion of a radiation pulse having a first spot size to form an intermediate cropped radiation pulse having an intermediate cropped spot with an intermediate cropped spot size less than the first spot size; a second beam cropper configured to crop the intermediate cropped spot to form a second cropped radiation pulse having a second cropped spot with a second cropped spot size less the intermediate cropped spot size.

In another embodiment, a method may include cropping a portion of a radiation pulse having a first spot size to form an intermediate cropped radiation pulse having an intermediate cropped spot with an intermediate cropped spot size less than the first spot size; and cropping the intermediate cropped spot to form a second cropped radiation pulse having a second cropped spot with a second cropped spot size less the intermediate cropped spot size.

DETAILED DESCRIPTION OF THE ILLUSTRATED EMBODIMENTS

The invention is described more fully hereinafter with reference to the accompanying drawings, in which example embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that, although the terms first, second, third, etc., may be used herein to describe various elements, components, regions, sets, etc., these elements, components, regions, sets, should not be limited by these terms. These terms are only used to distinguish one element, component, region, set, etc., from another element, component, region, set, etc. Thus, a first element, component, region, set, etc., discussed below could be termed a second element, component, region, set, etc., without departing from the teachings provided herein.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
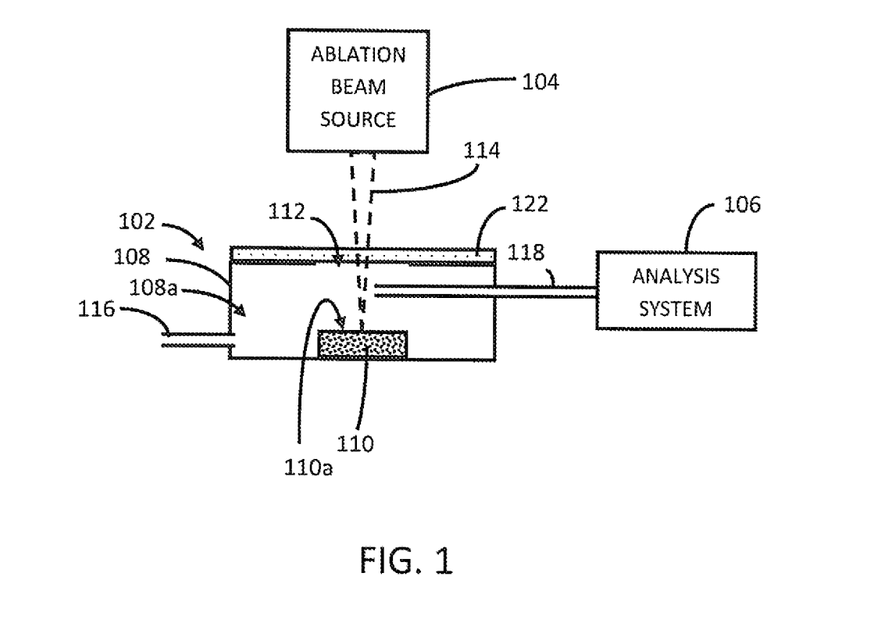
FIG. 1 is a schematic view illustrating an apparatus according to one embodiment.

FIG. 1 is a schematic view illustrating an apparatus according to one embodiment.

Referring to FIG. 1, an apparatus, such as apparatus 100, includes an ablation chamber 102, an ablation beam source 104, and an analysis system 106. In other embodiments, however, one or both of the ablation chamber 102 and the analysis system 106 may be omitted from the apparatus 100.

As exemplarily illustrated, the ablation chamber 102 includes an ablation chamber body 108 defining an accommodation region 108a configured to accommodate a target 110, a transmission window 112 configured to transmit a radiation pulse 114 along a transmission direction, a carrier gas inlet 116 configured to transmit a carrier gas (e.g., helium, argon, or the like or a combination thereof) from a carrier gas source (not shown) outside the ablation chamber 102 into the accommodation region 108a, and an aerosol transport conduit 118 coupled to the ablation chamber body 108. As will be discussed in greater detail below, the radiation pulse 114 has a fluence sufficient to ablate a portion of the target 110, thereby producing an aerosol plume (also referred to herein simply as an "aerosol," a "plume", a "plume of aerosol", or the like) including material ablated from the target entrained in the carrier gas. The aerosol transport conduit 118 is configured to receive at least a portion of the aerosol plume and transport the aerosol plume to the analysis system 106. As will be discussed in greater detail below, the analysis system 106 is configured to perform a compositional analysis on the aerosol transported by the aerosol transport conduit 118.

As will be discussed in greater detail below, the ablation beam source 104 is configured to generate the radiation pulse 114 having a desired spot size sufficient to produce an aerosol plume containing a desired amount of material removed from target 110. The analysis system 106 is configured to perform a compositional analysis on the aerosol plume transported by the aerosol transport conduit 118. The analysis system 106 may be provided as any suitable system such as an MS system (e.g., a noble gas MS system, a stable isotope MS system, etc.), an OES system, or the like, or a combination thereof. Generally, however, the analysis system 106 includes a sample preparation module configured to excite (e.g., ionize, atomize, illuminate, heat, etc.) one or more components of the received aerosol plume and a detector module configured to detect one or more characteristics (e.g., electromagnetic emission or absorption, particle mass, ionic mass, or the like or a combination thereof) of the excited component(s) of the received aerosol plume. Techniques for exciting one or more components of the received aerosol plume include plasma generation (e.g., via an inductively coupled plasma (ICP) torch), spark ionization, thermal ionization, atmospheric pressure chemical ionization, fast atom bombardment, glow discharge, and the like or a combination thereof. In one embodiment, the analysis system 106 may further include a sort module configured to sort the excited component(s) of the received aerosol plume based on one or more of the aforementioned characteristics before the detector module detects a characteristic.

In one embodiment, the apparatus 100 further includes a shield 122' disposed between the ablation chamber 102 and the ablation beam source 104. The shield 122 may be, formed of a material that is at least partially transparent to the radiation pulse 114. In the illustrated embodiment, the shield 122 abuts the ablation chamber body 108 and covers the transmission window 112 to prevent debris (e.g., dust, water vapor, atmospheric gases such as air, and the like) from undesirably entering into the accommodation region 108a during ablation of the target 110. The ablation beam source 106 is generally disposed in close proximity to the shield 122 (as illustrated), and may abut the shield 122, to reduce or eliminate any deleterious interference of transmission of the radiation pulse into the accommodation region 108a caused by debris outside the ablation chamber body 108. In one embodiment, the shield 122 may be coupled to one or both of the ablation beam source 104 and the ablation chamber body 108.

Figure 2:
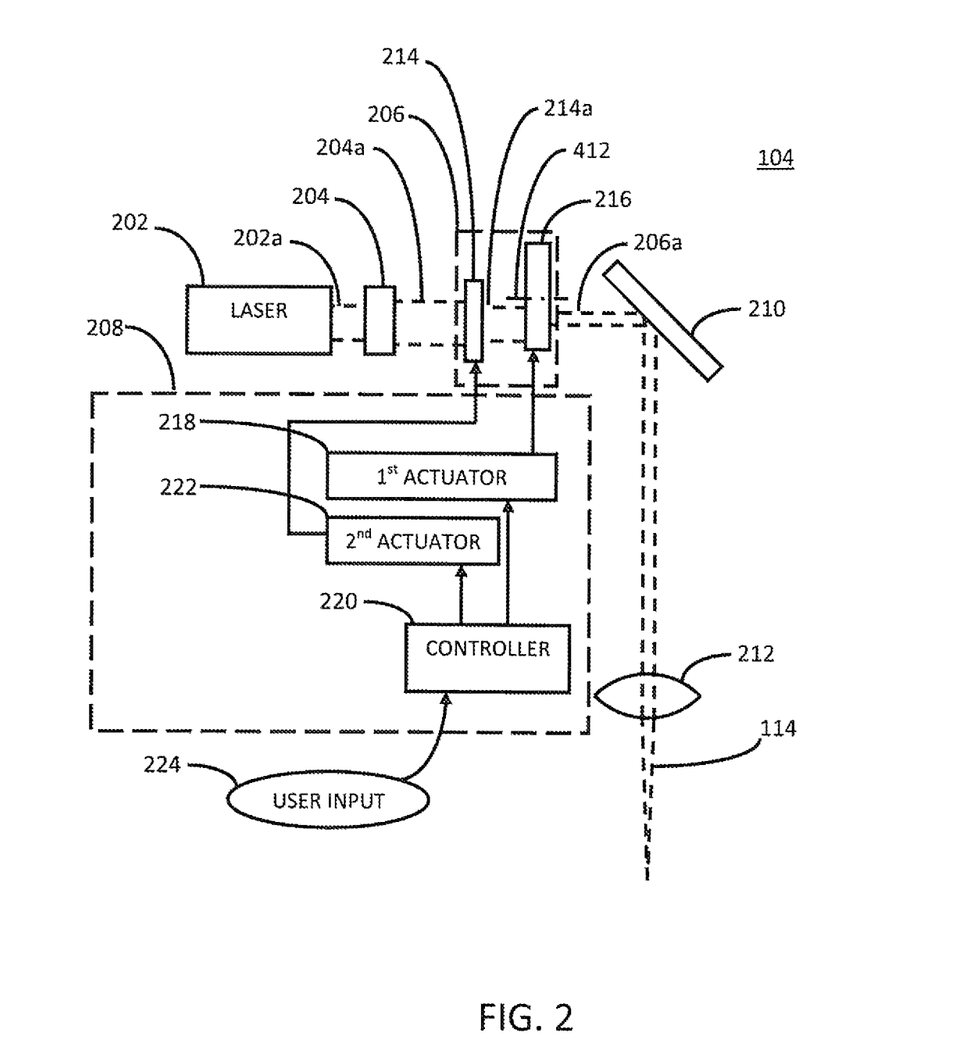
FIG. 2 is a schematic view illustrating one embodiment of the ablation beam source shown in FIG. 1.
Figure 3:
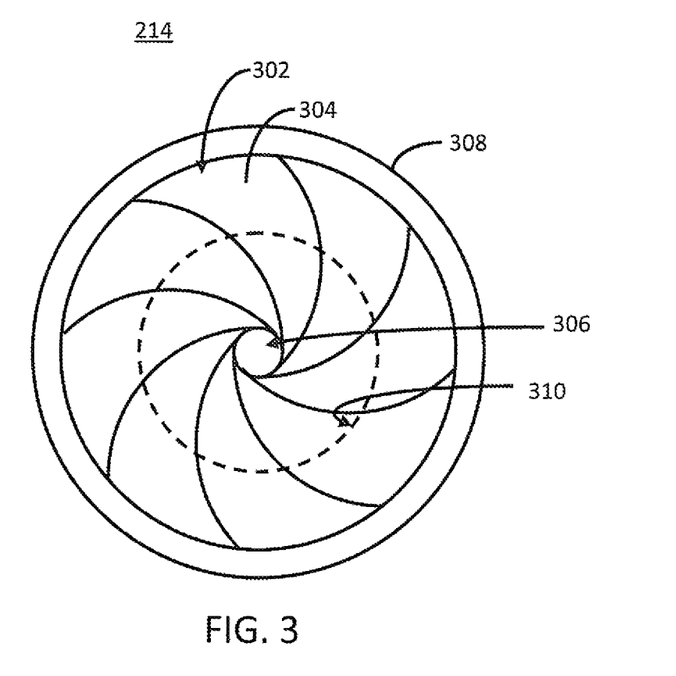
FIG. 3 is a plan view illustrating the first beam cropper shown in FIG. 2, according to one embodiment.
Figure 4:
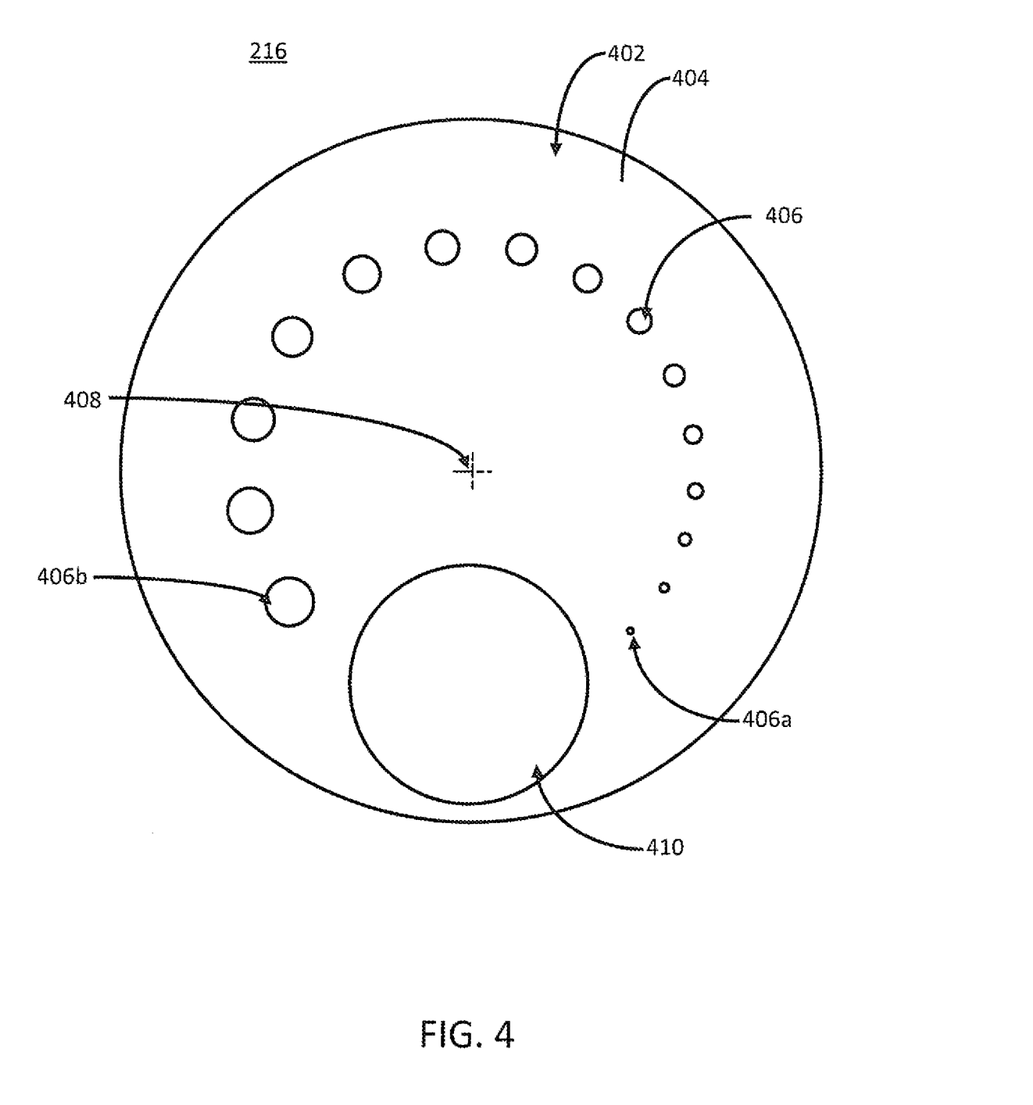
FIG. 4 is a plan view illustrating the second beam cropper shown in FIG. 2, according to one embodiment.

FIG. 2 is, a schematic view illustrating one embodiment of the ablation beam source shown in FIG. 1. FIG. 3 is a plan view illustrating the first beam cropper shown in FIG. 2, according to one embodiment. FIG. 4 is a plan view illustrating the second beam cropper shown in FIG. 2, according to one embodiment.

Referring to FIG. 2, the ablation beam source 104 shown in FIG. 1 may, according to one embodiment, include a radiation source 202 configured to produce a preliminary beam 202a of preliminary radiation pulses, a beam expander 204 configured to expand the beam 202a to produce an expanded beam 204a of preliminary radiation pulses, a beam cropping system 206 configured to crop a spot of a preliminary radiation pulse and produce a cropped beam 206a of cropped radiation pulses, a cropping control system 208 configured, to control the beam cropping system 206, and auxiliary optional components configured to focus, reflect, or otherwise modify the cropped radiation pulse produced by the beam cropping system 206 to produce the aforementioned radiation pulse 114. Examples of some auxiliary optional components include a mirror 210 configured to reflect the cropped beam 206a and a lens 212 (e.g., an objective or focusing lens) configured to focus each cropped radiation pulses within the cropped beam 206a and direct each focused cropped radiation pulse as the aforementioned radiation pulse 114. As used herein, any "beam" of radiation pulses can include only a single radiation pulse or a series of discrete radiation pulses.

Each preliminary radiation pulse in the beam 202a may have a spot with a preliminary spot size. For purposes of discussion, the term "spot size" will refer herein to the area of the spot of the radiation pulse. It will be appreciated that the "spot size" of a spot can be determined by measuring certain dimensions of the spot (e.g., the diameter, major diameter, conjugate diameter, etc.) and performing relevant calculations based on the measured dimensions, as would be understood by one of ordinary skill in the art. It will be appreciated that any radiation pulse in any of the beams discussed herein can have a spot having any desired geometry (e.g., circular, elliptical, square, rectangular, triangular, or the like or a combination thereof). Nevertheless, and for purposes of discussion only, it will be assumed that all radiation pulses in the beams discussed herein have spots that are generally circular in shape and, therefore, the spot size of a radiation pulse will correspond to the area of the spot, which can be determined according to the following equation:

$$A = \pi \left(\frac{d}{2}\right)^2$$

where A is the area of the circular spot and d is the diameter of the circular spot. In one embodiment, the preliminary spot size can be greater than about 19.5 mm$^2$ (corresponding to a spot diameter of about 5 mm) and less than about 38.5 mm$^2$ (corresponding to a spot diameter of about 7 mm).

In one embodiment, the radiation source 202 is provided as one or more lasers configured to generate a beam 202a of one or more laser radiation pulses. The one or more lasers may each be configured to generate laser radiation having a wavelength greater than about 157 nm and less than about 1064 nm. For example, the one or more lasers may each be configured to generate a wavelength selected from the group consisting of 266 nm, 213 nm, 193 nm, or the like. Each of the one or more lasers may be configured to generate laser pulses having pulse width between about 1.0 picoseconds to about 25 nanoseconds. The ablation beam source 104 may also include laser optics configured to focus the laser radiation generated by one or more of the lasers.

The beam expander 204 is configured to expand the spot size of the preliminary radiation pulses in the preliminary beam 202a from the preliminary spot size to an expanded spot size. Thus, the expanded spot size of a preliminary radiation pulse in the expanded beam 204a is larger than the preliminary spot size of the preliminary radiation pulse in the preliminary beam 202a. In one embodiment, the expanded spot size can be greater than about 50 mm$^2$ (corresponding to a spot diameter of about 8 mm) and less than about 78.5 mm$^2$ (corresponding to a spot diameter of about 10 mm). In another embodiment, however, the beam expander 204 may be omitted.

Generally, the beam cropping system 206 is configured to crop a preliminary radiation pulse and produce a cropped radiation pulse having a cropped spot size less than the expanded spot size. In one embodiment, the cropped spot size can also be less than the preliminary spot size. In another embodiment, however, the cropped spot size can be greater than the preliminary spot size. As will be discussed in greater detail below, the beam cropping system can be configured to adjust the cropped spot size such that the cropped spot size can be greater than about 0.78 $\mu m^2$ (corresponding to a spot diameter of about 1 $\mu m$) and less than about 63.5 $mm^2$ (corresponding to a spot diameter of about 9 mm).

In one embodiment, the beam cropping system 206 can be configured to adjust the cropped spot size such that the cropped spot size can be incrementally or continuously adjustable over a first range of cropped spot sizes between about 63.5 $mm^2$ (corresponding to a spot diameter of about 9 mm) and about 1.7 $mm^2$ (corresponding to a spot diameter of about 1.5 mm). In one embodiment, the beam cropping system 206 can be configured to incrementally adjust the cropped spot size over the first range of cropped spot sizes in increments between about 0.78 $\mu m^2$ (corresponding to an incremental change in spot diameter of about 1 $\mu m$) and about 78.5 $\mu m^2$ (corresponding to an incremental in spot diameter of about 10 $\mu m$). Accordingly, the beam cropping system 206 can be configured to adjust the intermediate cropped spot size to more than 50 intermediate cropped spot sizes. Of course, the beam cropping system 206 can also be configured to adjust the intermediate cropped spot size to less than 50 intermediate cropped spot sizes.

In one embodiment, the beam cropping system 206 can be configured to adjust the cropped spot size such that the cropped spot size can be incrementally adjusted over a second range of cropped spot sizes between about 1.7 $mm^2$ (corresponding to a spot diameter of about 1.5 mm) and about 0.78 $\mu m^2$ (corresponding to a spot diameter of about 1 $\mu m$). In one embodiment, the beam cropping system can be configured to incrementally adjust the cropped spot size over the second range of cropped spot sizes in increments between about 0.78 $\mu m^2$ (corresponding to an incremental change in spot diameter of about 1 $\mu m$) and about 19.6 $\mu m^2$ (corresponding to an incremental change in spot diameter of about 5 $\mu m$).

The beam cropping system 206 includes a first beam cropper 214 configured to adjust the cropped spot size over the aforementioned first range of cropped spot sizes as discussed above. In one embodiment, the first beam cropper 214 is configured to crop a portion of each preliminary radiation pulse in the expanded beam 204a (or the preliminary beam 202a, if the beam expander 204 is omitted) and pass the un-cropped portion of the preliminary radiation pulse as an intermediate cropped radiation pulse having an intermediate cropped spot with an intermediate cropped spot size. Accordingly, the first beam cropper 214 is configured to produce an intermediate cropped beam 214a of intermediate cropped radiation pulses, wherein each intermediate cropped radiation pulse has an intermediate cropped spot with an intermediate cropped spot size that is adjustable over the aforementioned first range of cropped spot sizes as discussed above.

The beam cropping system 206 also includes a second beam cropper 216 configured to adjust the cropped spot size over the aforementioned second range of cropped spot sizes as discussed above. In one embodiment, the second beam cropper 216 is configured to crop a portion of each intermediate cropped radiation pulse in the beam 204a (or in the beam 202a if the beam expander 204 is omitted) and pass the un-cropped portion of the intermediate cropped radiation pulse as a second cropped radiation pulse having an second cropped spot with an second cropped spot size. Accordingly, the second beam cropper 216 is configured to produce a second cropped beam 216a of second cropped radiation pulses, wherein each second cropped radiation pulse has a second cropped spot with a second cropped spot size that is adjustable over the aforementioned second range of cropped spot sizes as discussed above. As exemplarily illustrated, no additional beam croppers are disposed "downstream" of the second beam cropper 216. Accordingly, the second cropped radiation pulse can be output by the beam cropper system as the cropped radiation pulse. It will nevertheless be appreciated, however, that the beam cropping system may contain additional beam croppers the same as or different from the first beam cropper 214 or the second beam cropper 216.

Generally, the first beam cropper 214 can include a first diaphragm defining a first aperture that is disposed in a path along which the expanded beam 204a (or the preliminary beam 202a, if the beam expander 204 is omitted) is transmitted (i.e., along a beam transmission path). The first diaphragm is formed of any suitable material capable of blocking or otherwise impeding transmission of the preliminary radiation pulse such that a portion of the preliminary radiation pulse is selectively transmittable through the first aperture relative to the first diaphragm. In one embodiment, the first diaphragm is formed of a plurality of elements that define the first aperture. In one embodiment, at least one of the elements can be actuatable relative to another of the elements to adjust at least one of a size and a shape of the first aperture. The elements can be provided as any element capable of being selectively moved into and out of the beam transmission path (or otherwise capable of being selectively made opaque or suitably translucent) to block or otherwise impede transmission of at least a portion of a preliminary radiation pulse. Examples of elements capable of forming the first diaphragm include plates, reflective liquid crystal display elements, transmissive liquid crystal display elements, transflective liquid crystal display elements, or the like or a combination thereof.

Referring to FIG. 3, the first beam cropper 214 shown in FIG. 1 may, according to one embodiment, include a first diaphragm 302 formed of a plurality of elements such as blades 304 that overlap one another and are circumferentially arranged to define a first aperture 306. The blades 304 are circumferentially supported by a housing 308. The housing 308 can define the outermost boundary of a field or region through which radiation pulses are transmittable. Although not shown, the radially outer portion of each blade 304 is coupled to an actuating element (e.g., an actuator ring) that is movable within the housing 308. When the actuating element is moved, the blades 304 move relative to one another to change the size and/or shape of the aperture 306 (e.g., from the size and/or shape of the exemplarily illustrated aperture 306 to the size and/or shape exemplarily illustrated by the dashed line 310). Thus, the size of the aperture 306 corresponds to the intermediate cropped spot size.

The first beam cropper 214 can be actuated such that the blades 304 can be continuously or incrementally moveable to adjust the size of the aperture 306 such that the size of the aperture 306 is continuously or incrementally adjustable over the aforementioned first range of cropped spot sizes between about 63.5 $mm^2$ (corresponding to a spot diameter of about 9 mm) and about 1.7 $mm^2$ (corresponding to a spot diameter of about 1.5 mm). The size of the aperture 306 exemplarily illustrated in FIG. 3 can conceptually represent the size corresponding to the smaller end of the aforementioned first range of cropped spot sizes (i.e., about 1.7 mm², corresponding to a spot diameter of about 1.5 mm). Likewise, the dashed line 310 can conceptually represent the size corresponding to the larger end of the aforementioned first range of cropped spot sizes (i.e., about 63.5 mm², corresponding to a spot diameter of about 9 mm). In one embodiment, the first beam cropper 214 can be actuated can be configured to incrementally adjust the size of the aperture 306 over the first range of cropped spot sizes in increments between about 0.78 µm² (corresponding to an incremental change in spot diameter of about 1 µm) and about 78.5 µm² (corresponding to an incremental in spot diameter of about 10 µm).

It will be appreciated that the first beam cropper 214 described with respect to FIG. 3 is a mechanical iris. It will also be appreciated that the first beam cropper 214 can be provided as any type of mechanical iris (e.g., a mechanical iris configured to produce an aperture having a non-zero minimum size, a mechanical iris having a shutter configured to cover an aperture having a non-zero minimum size, a mechanical iris having two sets of blades each configured to block different regions of a field defined by the housing, or the like or a combination thereof).

Referring to FIG. 4, the second beam cropper 216 shown in FIG. 1 may, according to one embodiment, include a second diaphragm 402 formed of a single plate such as plate 404 having a plurality of second apertures 406 defined therein, which are circumferentially arranged around a point on the plate 404 identified the center of the cross-hairs 408. The plate 404 can be formed of any material capable of being selectively moved into and out of the beam transmission path to block or otherwise impede transmission of at least a portion of the intermediate cropped radiation pulse such that a portion of the intermediate cropped radiation pulse is selectively transmittable through one of the plurality of second apertures relative to the second diaphragm. The second apertures 406 can be formed in the plate 404 by any suitable process (e.g., mechanical drilling, water jet drilling, laser drilling, or the like or a combination thereof). Constructed as described above, the second diaphragm 402 is rotatable about an axis of rotation intersecting the aforementioned point on the plate 404. When mounted within the ablation beam source 104 (e.g., such that the point on the plate 404 is rotatable about the axis 412 shown in FIG. 2), each of the plurality of second apertures 406 is selectively disposable in the beam transmission path. Thus, the size of the second aperture 406 that is selectively disposed in the beam transmission path corresponds to the second cropped spot size.

The second beam cropper 216 can be actuated such that the plate 404 can be continuously or incrementally moveable to adjust the size of the aperture 306 such that the size of the aperture 306 is continuously or incrementally adjustable over the aforementioned second range of cropped spot sizes between about 1.7 mm² (corresponding to a spot diameter of about 1.5 mm) and about 0.78 µm² (corresponding to a spot diameter of about 1 µm). The size of a first one of the plurality of second apertures 406 (i.e., second aperture 406a) exemplarily illustrated in FIG. 4 can conceptually represent the size corresponding to the smaller end of the aforementioned second range of cropped spot sizes (i.e., about 0.78 µm², corresponding to a spot diameter of about 1 µm). Likewise, the size of a second one of the plurality of second apertures 406 (i.e., second aperture 406b) exemplarily illustrated in FIG. 4 can conceptually represent the size corresponding to the larger end of the aforementioned second range of cropped spot sizes (i.e., about 1.7 mm², corresponding to a spot diameter of about 1.5 mm). In one embodiment, the sizes of the second apertures 406 incrementally vary along a circumferential direction around the aforementioned point on the plate 404 such that a difference in size between circumferentially adjacent ones of the second apertures 406 is between about 0.78 µm² (corresponding to an incremental change in spot diameter of about 1 µm) and about 19.6 µm² (corresponding to an incremental change in spot diameter of about 5 µm).

Although FIG. 4 illustrates the second beam cropper 216 as including 15 second apertures 406 defined in the plate 404, it will be appreciated that more or fewer second apertures 406 can be defined in the plate 404. For example, the plate 404 can include 13, 14, 16, 17, . . . 30, 31, 50, 100, etc. In one embodiment, a distance between circumferentially adjacent ones of the second apertures 406 can be less than the expanded spot size. In another embodiment, the distance between circumferentially adjacent ones of the second apertures 406 can be less than the preliminary spot size. In yet another embodiment, the distance between circumferentially adjacent ones of the second apertures 406 can be less than or equal to any intermediate cropped spot size.

The second beam cropper 216 can be actuated such that the plate 404 can be continuously or incrementally moveable to adjust the size of the aperture 306 such that the size of the aperture 306 is continuously or incrementally adjustable over the aforementioned second range of cropped spot sizes between about 1.7 mm² (corresponding to a spot diameter of about 1.5 mm) and about 0.78 µm² (corresponding to a spot diameter of about 1 µm). The size of a first one of the plurality of second apertures 406 (i.e., second aperture 406a) exemplarily illustrated in FIG. 4 can conceptually represent the size corresponding to the smaller end of the aforementioned second range of cropped spot sizes (i.e., about 0.78 µm², corresponding to a spot diameter of about 1 µm). Likewise, the size of a second one of the plurality of second apertures 406 (i.e., second aperture 406b) exemplarily illustrated in FIG. 4 can conceptually represent the size corresponding to the larger end of the aforementioned second range of cropped spot sizes (i.e., about 1.7 mm², corresponding to a spot diameter of about 1.5 mm). In one embodiment, the sizes of the second apertures 406 incrementally vary along a circumferential direction around the aforementioned point on the plate 404 such that a difference in size between circumferentially adjacent ones of the second apertures 406 is between about 0.78 µm² (corresponding to an incremental change in spot diameter of about 1 µm) and about 19.6 µm² (corresponding to an incremental change in spot diameter of about 5 µm).

Referring still to FIG. 4, the second beam cropper 216 may also include a third aperture 410 formed in the plate 404. The size and/or shape of the third aperture 410 is equal to, or substantially equal to, the size and/or shape exemplarily illustrated by the dashed line 310 shown in FIG. 3. In one embodiment, the size of the third aperture 410 is equal to, or substantially equal to the size corresponding to the larger end of the aforementioned first range of cropped spot sizes (i.e., about 63.5 mm², corresponding to a spot diameter of about 9 mm). When mounted within the ablation beam source 104, the third aperture 406 can be selectively disposable in the beam transmission path. Thus when the third aperture 410 is disposed in the beam transmission path, all of the intermediate cropped radiation pulse or substantially all of the intermediate cropped radiation pulse can be passed by the second beam cropper 216 and output by the beam cropping system as a cropped radiation pulse in the beam of cropped radiation pulses 206a.

Referring back to FIG. 2, the cropping control system 208 includes a first actuator 218 operatively coupled to the second beam cropper 216 and a controller 220 communicatively coupled (e.g., wired or wirelessly) to the first actuator 218.

The first actuator 218 is operative to actuate the second beam cropper 216 such that one of the second apertures 406 or the third aperture 410 is disposed in the beam transmission path. The cropping control system 208 can further include a second actuator 222 operatively coupled to the first beam cropper 214 and communicatively coupled (e.g., wired or wirelessly) to the controller 220. The second actuator 222 is operative to actuate the first beam cropper 214 to adjust the size and/or shape of the aperture 306 disposed in the beam transmission path. The first actuator 218 and/or the second actuator 222 can be provided as any type of actuator (e.g., electric actuator, pneumatic actuator, hydraulic actuator, or the like or a combination thereof) capable of actuating respective ones of the second beam cropper 216 and the first beam cropper 214.

Generally, the controller 220 includes a processor (not shown) configured execute instructions stored in memory (not shown) to operate the first actuator 218 and the second actuator 222 in a controlled manner (e.g., based on user input 224 received from a user interface, not shown). In one embodiment, the controller 220 can control an operation of the first actuator 218 based on an operation of the second actuator 222.

For example, when user input 224 received by the controller 220 indicates that a cropped radiation pulse having a desired cropped radiation spot size greater than the size corresponding to the smaller end of the aforementioned first range of cropped spot sizes (or less than the size corresponding to the larger end of the aforementioned second range of cropped spot sizes), the controller 220 controls an operation of the second actuator 222 to actuate the first beam cropper 214 to form intermediate cropped radiation pulse with an intermediate cropped spot size equal (or substantially equal to) the desired cropped radiation spot size and also controls an operation of the first actuator 218 to actuate the second beam cropper 216 to dispose the third aperture 410 in the beam transmission path.

In another example, when user input 224 received by the controller 220 indicates that a cropped radiation pulse having a desired cropped radiation spot size equal to or substantially equal to the size corresponding to the smaller end of the aforementioned first range of cropped spot sizes (or equal to or substantially equal to the size corresponding to the larger end of the aforementioned second range of cropped spot sizes), the controller 220 can simply control an operation of the first actuator 218 to actuate the second beam cropper 216 to dispose an appropriate one of the plurality of second apertures 406 in the beam transmission path to form a second cropped radiation pulse with a second cropped spot size equal (or substantially equal to) the desired cropped radiation spot size.

In another example, when user input 224 received by the controller 220 indicates that a cropped radiation pulse having a desired cropped radiation spot size less than the size corresponding to the smaller end of the aforementioned first range of cropped spot sizes, the controller 220 can simply control an operation of the first actuator 218 to actuate the second beam cropper 216 to dispose an appropriate one of the plurality of second apertures 406 in the beam transmission path to form a second cropped radiation pulse with a second cropped spot size equal (or substantially equal to) the desired cropped radiation spot size.

The controller 220 can include operating logic (not shown) that defines various control, management and/or regulation functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, controller 220 includes a programmable microcontroller microprocessor, or other processor that can include one or more processing units arranged to execute instructions stored in memory (not shown) in accordance with the operating logic. Memory can include one or more types including semiconductor, magnetic, and/or optical varieties, and/or may be of a volatile and/or nonvolatile variety. In one embodiment, memory stores instructions that can be execute by the operating logic. Alternatively or additionally, memory may store data that is manipulated by the operating logic. In one arrangement, operating logic and memory are included in a controller/processor form of operating logic that manages and controls operational aspects of the transfer system beam cropper system 206, although in other arrangements they may be separate.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

Having described the apparatus above, it will be appreciated that embodiments of the present invention may be implemented and practiced in many different forms. For example, in one embodiment of the present invention, an apparatus may be provided with a first beam cropper configured to crop a portion of a radiation pulse having a first spot size to form an intermediate cropped radiation pulse having an intermediate cropped spot with an intermediate cropped spot size less than the first spot size; and a second beam cropper configured to crop the intermediate cropped spot to form a second cropped radiation pulse having a second cropped spot with a second cropped spot size less the intermediate cropped spot size.

In another embodiment of the present invention, a method may include controlling an operation of one beam cropper based on an operation of another beam cropper.

What is claimed is:

1. An apparatus comprising:
a first beam cropper having a first diaphragm defining a first aperture disposed in a beam transmission path along which a beam of radiation pulses is transmittable, the beam of radiation pulses radiation pulse having a first spot with a first spot size, wherein a first beam cropper is configured such that a portion of a radiation pulse in a beam of radiation pulses in the beam transmission path is selectively transmittable through the first aperture relative to the first diaphragm to pass an intermediate cropped radiation pulse having an intermediate cropped spot with an intermediate cropped spot size less than the first spot size; and
a second beam cropper having a second diaphragm defining a plurality of second apertures, wherein the second beam cropper is configured such that each of the plurality of second apertures is selectively disposable in the beam transmission path, wherein each of the plurality of second apertures is configured such that a portion of the cropped radiation pulse is selectively transmittable through the plurality second apertures relative to the second diaphragm to pass a second cropped radiation pulse having a second cropped spot with a second cropped spot size less the intermediate cropped spot size.

2. The apparatus of claim 1, wherein the first diaphragm comprises a plurality of elements defining the first aperture, wherein at least one of the plurality of elements is actuatable relative to another of the plurality of elements to adjust at least one of a size and a shape of the first aperture.

3. The apparatus of claim 2, wherein the at least one of the plurality of elements is movable relative to another of the plurality of elements to adjust at least one of a size and a shape of the first aperture.

4. The apparatus of claim 2, wherein at least one of a size and a shape of the first aperture is adjustable such that the intermediate cropped spot size is adjustable over a first range of cropped spot sizes between a first intermediate cropped spot size and a second intermediate cropped spot size less than the first intermediate cropped spot size.

5. The apparatus of claim 4, wherein the first intermediate cropped spot size is less than the first spot size.

6. The apparatus of claim 4, wherein the first intermediate cropped spot size is greater than about 1.7 mm$^2$.

7. The apparatus of claim 4, wherein the second intermediate cropped spot size is less than about 63.5 mm$^2$.

8. The apparatus of claim 4, wherein at least one of a size and a shape of the first aperture is adjustable such that the intermediate cropped spot size is adjustable to at least one additional cropped size less than the first intermediate cropped spot size and greater than the second intermediate cropped spot size less.

9. The apparatus of claim 8, wherein at least one of a size and a shape of the first aperture is adjustable such that the intermediate cropped spot size is adjustable to more than 50 intermediate cropped spot sizes.

10. The apparatus of claim 4, wherein one of the plurality of second apertures is configured such that the second cropped size is substantially equal to the second intermediate cropped spot size.

11. The apparatus of claim 1, wherein the plurality of second apertures comprises at least 30 second apertures.

12. The apparatus of claim 1, wherein a distance between at least two of the plurality of second apertures is less than a maximum dimension of the first spot.

13. The apparatus of claim 1, wherein second diaphragm is rotatable about an axis of rotation and the plurality of second apertures are circumferentially arranged within the second diaphragm about the axis of the rotation.

14. The apparatus of claim 1, wherein the second diaphragm further defines a third aperture, wherein the second beam cropper is configured such that the third aperture is selectively disposable in the beam transmission path, wherein the third aperture is configured such that at least substantially all of the intermediate cropped radiation pulse is passed through the third aperture.

15. The apparatus of claim 1, further comprising an ablation beam source configured to produce the beam of radiation pulses.

16. The apparatus of claim 15, wherein the ablation beam source comprises a laser configured to generate a pulse of laser radiation as the radiation pulse.

17. The apparatus of claim 16, further comprising a beam expander disposed between the laser and the first beam cropper.

18. The apparatus of claim 17, further comprising:
an objective lens disposed in the beam transmission path and configured to focus the second cropped radiation pulse to produce a focused radiation pulse having a fluence sufficient to ablate a portion of a target and produce an aerosol including material ablated from the target; and
an aerosol transmission conduit configured to transport the aerosol to an analysis system.

19. The apparatus of claim 1, further comprising:

a first actuator coupled to the second beam cropper, wherein the first actuator is operative to actuate the second diaphragm such that one of the plurality of second apertures is disposed in the beam transmission path; and a controller coupled to the first actuator, wherein the controller includes:

a memory; and a processor configured to execute instructions stored in the memory to control the operation of the first actuator.

20. The apparatus of claim 19, wherein the first diaphragm comprises a plurality of elements defining the first aperture, wherein at least one of the plurality of elements is actuatable relative to another of the plurality of elements to adjust at least one of a size and a shape of the first aperture, the apparatus further comprising a second actuator coupled to the first beam cropper and the controller, wherein the second actuator is operative to actuate the at least one of the plurality of elements, and wherein the processor is further configured to execute instructions stored in the memory to control the operation of the second actuator.

21. The apparatus of claim 20, wherein the processor is further configured to execute instructions stored in the memory to control the operation of the first actuator based on the operation of the second actuator.

22. A method comprising:

cropping a portion of a radiation pulse having a first spot size to form an intermediate cropped radiation pulse having an intermediate cropped spot with an intermediate cropped spot size less than the first spot size; and cropping the intermediate cropped spot to form a second cropped radiation pulse having a second cropped spot with a second cropped spot size less the intermediate cropped spot size.

23. The method of claim 22, wherein the radiation pulse is a pulse of laser radiation.

* * * * *